(12) United States Patent
Kadota et al.

(10) Patent No.: US 11,319,003 B2
(45) Date of Patent: May 3, 2022

(54) ENDLESS-TRACK TRAVELING APPARATUS, AND MOVABLE BODY OF GENERATOR INSPECTION ROBOT INCLUDING THE SAME

(71) Applicant: Mitsubishi Electric Corporation, Tokyo (JP)

(72) Inventors: Naoya Kadota, Tokyo (JP); Kota Yano, Tokyo (JP); Daisuke Mizuno, Tokyo (JP); Yoshihikro Morimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 59 days.

(21) Appl. No.: 17/045,504

(22) PCT Filed: Apr. 23, 2018

(86) PCT No.: PCT/JP2018/016436
§ 371 (c)(1),
(2) Date: Oct. 6, 2020

(87) PCT Pub. No.: WO2019/207623
PCT Pub. Date: Oct. 31, 2019

(65) Prior Publication Data
US 2021/0155300 A1 May 27, 2021

(51) Int. Cl.
*B62D 55/06* (2006.01)
*B62D 55/265* (2006.01)
(Continued)

(52) U.S. Cl.
CPC ........... *B62D 55/06* (2013.01); *B62D 55/265* (2013.01); *H02K 7/1004* (2013.01)

(58) Field of Classification Search
CPC .. B62D 55/06; B62D 55/108; B62D 55/1083; B62D 55/1086; B62D 55/112;
(Continued)

(56) References Cited

U.S. PATENT DOCUMENTS 1,488,629 A * 4/1924 Wick ..................... B62D 55/10
 305/127
3,682,265 A * 8/1972 Hiraoka .................. B63B 59/10
 180/9.1
(Continued)

FOREIGN PATENT DOCUMENTS

JP  H06144314 A  5/1994
JP  2002046667 A  2/2002
(Continued)

OTHER PUBLICATIONS

International Search Report (with English Translation) and Written Opinion issued in corresponding International Patent Application No. PCT/JP2018/016436, 9 pages (dated Jul. 3, 2018).

*Primary Examiner* — Anne Marie M Boehler
(74) *Attorney, Agent, or Firm* — Buchanan Ingersoll & Rooney PC

(57) ABSTRACT

An endless-track traveling apparatus includes a casing, pulleys having axes arranged in parallel in the casing, a motor for driving the pulleys, and an endless track wound on outer circumferential surface portions of the pulleys to rotate together with the pulleys and move on a traveling target. The endless-track traveling apparatus further includes: a plate-shaped member disposed in contact with the endless track and opposed to the traveling target in a space surrounded by the endless track, and fitted in the casing; a magnet fixed in the casing to attract the traveling target; and an elastic member having one end in contact with an inside of the casing and another end in contact with the plate-shaped (Continued)

member, and urging the plate-shaped member in such a direction as to press the plate-shaped member against the endless track.

6 Claims, 12 Drawing Sheets

(51) Int. Cl.
  *B62D 55/104* (2006.01)
  *H02K 7/10* (2006.01)
(58) Field of Classification Search
  CPC .. B62D 55/1125; B62D 55/265; B62D 55/30; B62D 55/075; H02K 7/1004
  USPC ................................ 180/9.32, 901; 305/127
  See application file for complete search history.

(56) References Cited

U.S. PATENT DOCUMENTS

| | | | | |
|---|---|---|---|---|
| 4,842,086 | A * | 6/1989 | Michna | B62D 55/265 |
| | | | | 180/9.1 |
| 6,253,867 | B1 * | 7/2001 | Lillbacka | B60G 15/12 |
| | | | | 180/193 |
| 6,305,762 | B1 * | 10/2001 | Oertley | B62D 55/06 |
| | | | | 305/143 |
| 7,201,055 | B1 | 4/2007 | Bagley et al. | |
| 7,624,827 | B2 * | 12/2009 | Moser | B62D 55/108 |
| | | | | 180/9.32 |
| 8,567,536 | B1 * | 10/2013 | Canfield | B62D 55/065 |
| | | | | 180/9.3 |
| 10,315,715 | B2 * | 6/2019 | Beard | B62D 55/202 |
| 2002/0104693 | A1 * | 8/2002 | Moore | G01R 31/34 |
| | | | | 180/9.1 |
| 2010/0231034 | A1 | 9/2010 | Kanzler | |
| 2014/0144715 | A1 * | 5/2014 | Albin | H01F 7/0231 |
| | | | | 180/9.1 |
| 2017/0291653 | A1 * | 10/2017 | Hruska | B62D 49/0628 |
| 2018/0237085 | A1 * | 8/2018 | Jiang | H02S 40/10 |
| 2019/0283820 | A1 * | 9/2019 | Park | B62D 55/06 |
| 2019/0329399 | A1 * | 10/2019 | Mizuno | B62D 55/0847 |
| 2021/0009214 | A1 * | 1/2021 | Jiang | B62D 55/125 |

FOREIGN PATENT DOCUMENTS

| | | |
|---|---|---|
| JP | 3484619 B2 | 1/2004 |
| JP | 2004232702 A | 8/2004 |
| JP | 2010506780 A | 3/2010 |
| JP | 2016084118 A | 5/2016 |
| JP | 5992893 B2 | 9/2016 |
| JP | 2016224854 A | 12/2016 |

\* cited by examiner

ENDLESS-TRACK TRAVELING APPARATUS, AND MOVABLE BODY OF GENERATOR INSPECTION ROBOT INCLUDING THE SAME

TECHNICAL FIELD

The present disclosure relates to endless-track traveling apparatuses, and movable bodies, of generator inspection robots, including the same.

BACKGROUND ART

Examples of methods for causing a movable body, such as an inspection robot, to travel using a drive apparatus, such as a motor, include a wheel-driving method in which the movable body is caused to travel with a wheel being in contact with a traveling target, and an endless track-driving method in which the movable body is caused to travel with an endless track, such as a crawler belt, being in contact with the traveling target.

Examples of the wheel-driving method include: a four-wheel independent driving method in which all of four wheels provided at, for example, forward and rearward portions of a movable body are driven by independent power sources to enable the movable body to travel with stability even against an obstacle, such as a difference in level, on a traveling target; and a front-and-rear wheel synchronous driving method in which timing pulleys are provided at front and rear wheels of a movable body, and a timing belt is wound on the front and rear timing pulleys to drive the front and rear wheels synchronously (see, for example, patent document 1). In addition, as a movable body that travels in a narrow gap employing the wheel-driving method, a traveling apparatus has been proposed in which a plurality of wheels are arranged in series with one wheel disposed at each of forward and rearward portions of a movable body having a width substantially equal to the width of each wheel, and a device such as a control box provided with a control circuit board is installed in a space existing between the front and rear wheels (see, for example, patent document 2).

As an example of the endless track-driving method, a method has been proposed in which a crawler belt made of a soft material and wound on front and rear pulleys is pressed against a traveling target during travel by generating a negative pressure in a decompression chamber provided in a movable body to bring the crawler belt into stable contact with the traveling target (see, for example, patent document 3). In addition, a mechanism has been proposed in which treads of crawler shoes arranged along an outer circumference of a crawler belt are prevented from bending in a valley-like manner in order to suppress influence of unevenness of a traveling target (see, for example, patent document 4).

Regarding a means for detecting the condition of the traveling target in each driving method, determining the condition of the traveling target by detecting a distance through reception of a reflected light for a light emitted toward a space in front in the direction of traveling (see, for example, patent document 5), and detecting an abnormal state of traveling using a distance sensor directed toward the traveling target and performing control (see, for example, patent document 6), have been proposed.

CITATION LIST

Patent Documents

Patent Document 1: Japanese Laid-Open Patent Publication No. 2004-232702
Patent Document 2: Japanese Patent No. 5992893
Patent Document 3: Japanese Laid-Open Patent Publication No. 2016-084118
Patent Document 4: Japanese Laid-Open Patent Publication No. 2002-46667
Patent Document 5: Japanese Laid-Open Patent Publication No. 2016-224854
Patent Document 6: Japanese Patent No. 3484619

SUMMARY OF THE INVENTION

Problems to be Solved by the Invention

In patent document 1 mentioned above, although the movable body is capable of freely moving about and smoothly getting over obstacles employing a four-wheel driving method, there is a problem that a size reduction that will enable the movable body to travel in a narrow gap is difficult. Meanwhile, in patent document 2 mentioned above, although a thickness reduction is achieved, there is a problem that, if a contact between a traveling target and a bottom surface of a body of the traveling apparatus occurs due to an obstacle, such as a projection or a recess like a hole, existing in the traveling target, the traveling apparatus may become incapable of traveling, and significant vibration may occur in the traveling apparatus. An increase in diameter of the wheels is desirable to avoid such a problem, but the increase in the diameter of the wheels would lead to an increase in size of the traveling apparatus as a whole, making it difficult to achieve a reduction in thickness of the traveling apparatus.

In the endless track-driving method, portions of the crawler belt which are made to be in contact with the traveling target need to be pressed against the traveling target with at least three pulleys to make the crawler belt be in stable contact with the traveling target, and this involves a problem of an increased size of the traveling apparatus due to an increased number of parts, which includes the pulleys. In patent document 3 mentioned above, although an improvement is achieved in terms of the contact between the crawler belt and the traveling target without an increase in the number of pulleys, there is a problem that the decompression chamber is needed, which leads to an increased size of the traveling apparatus. In patent document 4 mentioned above, although an improvement in performance in traveling is achieved due to the crawler shoes, there is a problem that a plurality of rollers to maintain the quality of the contact are needed, which results in an increase in the number of parts, making it difficult to achieve a size reduction.

In patent documents 5 and 6 mentioned above, although the condition of the traveling target is judged with provision of the distance sensor, it is difficult to detect all of small projections and recesses on a surface, extraneous objects, etc., and an increase in the size of the traveling apparatus is required to achieve improved precision in detection.

The present disclosure has been made to solve the above problems, and an object of the present disclosure is to obtain: an endless-track traveling apparatus that is able to achieve reductions in size and thickness, and is able to smoothly travel with suppressed vibration even when there is an obstacle formed by a groove or the like existing in a traveling target; and a movable body, of a generator inspection robot, which includes the endless-track traveling apparatus.

Solution to the Problems

An endless-track traveling apparatus according to one aspect of the present disclosure includes: a casing; pulleys having axes arranged in parallel in the casing; a motor for driving the pulleys; and an endless track wound on outer circumferential surface portions of the pulleys to rotate together with the pulleys and move on a traveling target. The endless-track traveling apparatus further includes: a plate-shaped member disposed in contact with the endless track and opposed to the traveling target in a space surrounded by the endless track, and fitted in the casing; a magnet fixed in the casing to attract the traveling target; an elastic member having one end in contact with an inside of the casing and another end in contact with the plate-shaped member, and urging the plate-shaped member in such a direction as to press the plate-shaped member against the endless track; and a sensor for detecting expansion and contraction of the elastic member.

Effect of the Invention

The endless-track traveling apparatus according to one aspect of the present disclosure can smoothly travel with suppressed vibration even when there is an obstacle formed by a groove or the like existing in a traveling target.

DESCRIPTION OF EMBODIMENTS

Figure 1:
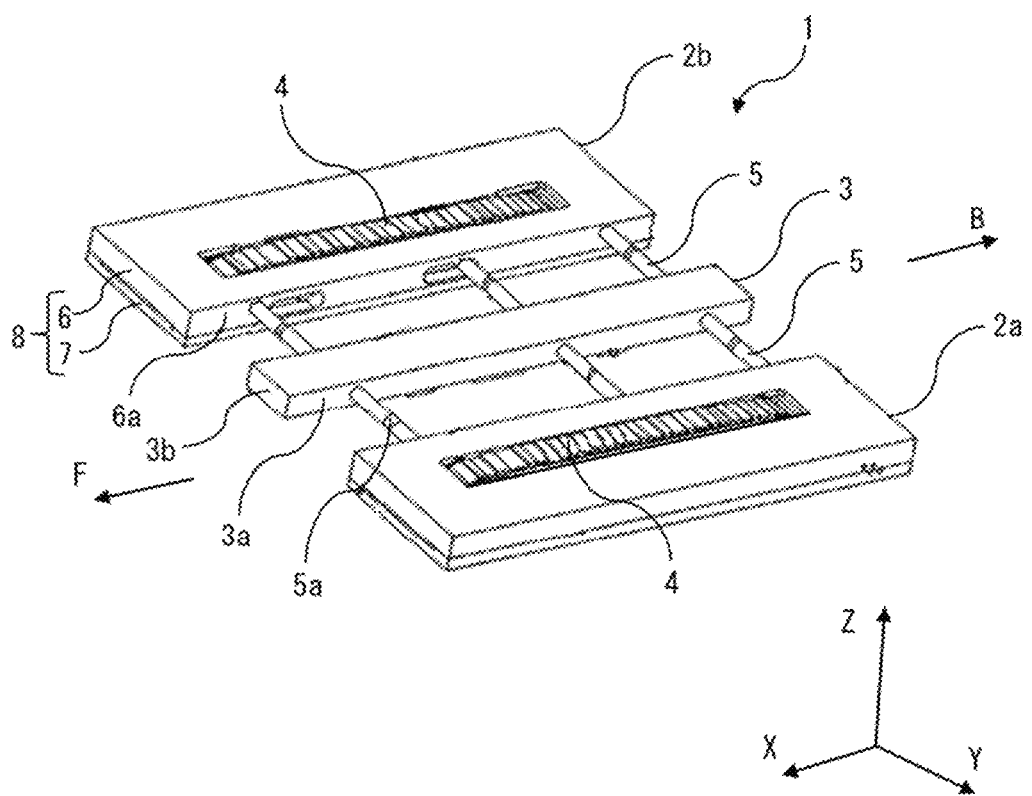
FIG. 1 is a perspective view illustrating an outline of the structure of a movable body including endless-track traveling apparatuses according to a first embodiment of the present disclosure.

Hereinafter, endless-track traveling apparatuses according to embodiments of the present disclosure will be described with reference to the drawings, and in the following description, the same or corresponding members or portions in the drawings are designated by the same reference numerals.

First Embodiment

The schematic structure of a movable body 1, of a generator inspection robot, which includes endless-track traveling apparatuses 2 according to a first embodiment of the present disclosure, will be described below. FIG. 1 is a perspective view illustrating an outline of the structure of the movable body 1. The movable body 1 is a generator inspection robot which is used to conduct, for example, an interlayer short inspection or a wedge tapping inspection for a large-sized generator. In FIG. 1, the movable body 1 is placed on an xy plane, which is a traveling target on which the movable body 1 is to travel, and an x direction and a−x direction correspond to a forward direction F and a backward direction B, respectively, for the movable body 1.

The movable body 1 includes two endless-track traveling apparatuses 2 (a first endless-track traveling apparatus 2a and a second endless-track traveling apparatus 2b) and a sensor mounting unit 3, each of which has the shape of a rectangular parallelepiped. The first endless-track traveling apparatus 2a and the second endless-track traveling apparatus 2b are coupled to side wall portions 3a, of the sensor mounting unit 3, which are opposed to each other and extend in the longitudinal direction of the sensor mounting unit 3, through coupling members 5, and are arranged in parallel so as to be line-symmetrical with respect to the sensor mounting unit 3.

Each endless-track traveling apparatus 2 has a crawler belt 4, which is an endless track, provided in a base portion 6 of a casing 8. The crawler belt 4 makes contact with the traveling target on a side on which a cover portion 7 lies. The coupling members 5 are joined to a side portion 6a of the base portion 6. Inspection sensors used for inspection, such as a force sensor, an acceleration sensor, etc., and an inspection device, such as a camera or the like, are mounted inside a casing 3b of the sensor mounting unit 3. The sensor mounting unit 3 is supported by the first endless-track traveling apparatus 2a and the second endless-track traveling apparatus 2b through the coupling members 5 without making contact with the traveling target. Each coupling member 5 is made of, for example, aluminum, and includes a bend portion 5a having a bending mechanism. Bending of the bend portions 5a enables the movable body 1 to travel with the crawler belts 4 being in sufficient contact with the traveling target even if the traveling target has an arc-shaped surface, thus, the traveling target is not limited to a flat surface.

The movable body 1 travels straight in the direction F or B when the two crawler belts 4 are caused to rotate at the same speed in the same direction. In addition, the movable body 1 is able to perform a rotating operation when the two crawler belts 4 are caused to rotate at the same speed in opposite directions, and is able to travel while turning rightward or leftward when the two crawler belts 4 are caused to rotate at different speeds in the same direction. For example, when the movable body 1 is traveling forward in the direction F, it is possible to cause the movable body 1 to travel while turning rightward by making the speed of the crawler belt 4 of the second endless-track traveling apparatus 2b slower than the speed of the crawler belt 4 of the first endless-track traveling apparatus 2a, and to cause the movable body 1 to travel while turning leftward by making the speed of the crawler belt 4 of the first endless-track traveling apparatus 2a slower than the speed of the crawler belt 4 of the second endless-track traveling apparatus 2b.

Figure 2:
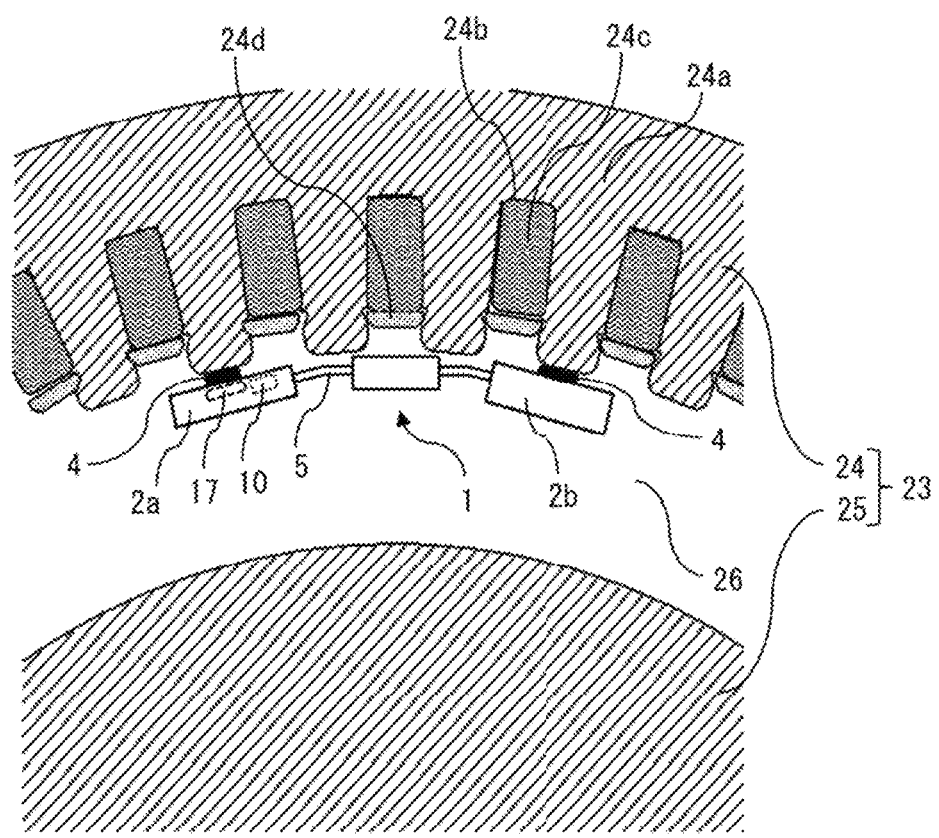
FIG. 2 is a diagram for explaining normal traveling of the movable body including the endless-track traveling apparatuses according to the first embodiment.

Next, an operation at the time of an inspection with the movable body 1 will be described below. FIG. 2 is a diagram for explaining normal traveling of the movable body 1. The movable body 1 is inserted into a space portion 26 between a stator 24 and a rotor 25 of a generator 23, and travels in an axial direction, which is perpendicular to the sheet of the drawing, to inspect an interior of the generator 23. In FIG. 2, a cross-section of the generator 23 is illustrated. The stator 24 includes a stator core 24a formed by stacked magnetic steel sheets, coils 24c inserted in slots 24b provided at regular intervals in the stator core 24a, and resin members 24d which hold the coils 24c.

Because the stator core 24a, which is the traveling target of the movable body 1, has an arc-shaped surface, the coupling members 5 are bent to make the crawler belts 4 be in contact with the stator core 24a. A magnet 10, which is provided in an interior of each of the first endless-track traveling apparatus 2a and the second endless-track traveling apparatus 2b, attracts the stator core 24a. As will be described in detail below, with this attraction, each crawler belt 4 is pressed toward the stator core 24a by a crawler-side pressing member 17, and is adhered to the stator core 24a. The movable body 1 is able to travel over a surface of the stator core 24a with this adhesion of the crawler belt 4 being maintained and the crawler belt 4 rotating. The position of the traveling movable body 1 is not limited to the position illustrated in FIG. 2, and the movable body 1 can travel at another position in the sheet space of FIG. 2 where the movable body 1 can be adhered to the stator core 24a. In addition, the traveling direction of the movable body 1 is adjusted according to a difference in speed between the two crawler belts 4, so that the movable body 1 is able to travel while being corrected for straight traveling. Because attraction by the magnet 10 is not generated on each resin member 24d, the movable body 1 travels only on the stator core 24a, to which the movable body 1 is attracted, and is able to move without being detached from the stator core 24a.

Figure 3:
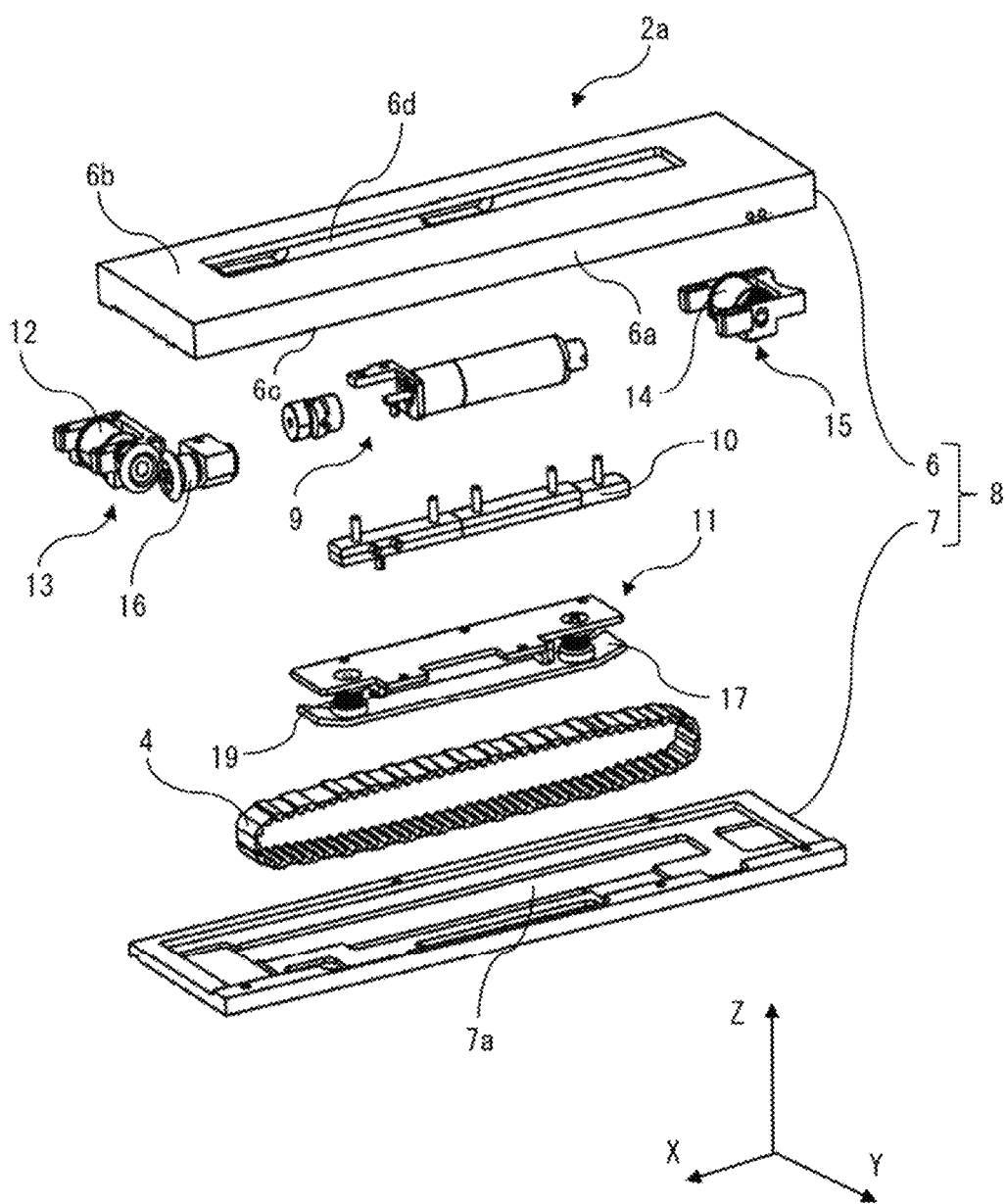
FIG. 3 is an exploded perspective view illustrating the schematic structure of the endless-track traveling apparatus according to the first embodiment.

When the movable body 1 has completed traveling in the axial direction of the generator 23, the movable body 1 is removed from the generator 23, and is again caused to travel in the axial direction of the generator 23 with a shift in the circumferential position of the generator 23. In this manner, the generator 23 is inspected by the movable body 1 throughout the entire circumferential extent thereof. Next, the structure of each endless-track traveling apparatus 2 according to the first embodiment will be described below. FIG. 3 is an exploded perspective view illustrating the schematic structure of the first endless-track traveling apparatus 2a. The first endless-track traveling apparatus 2a and the second endless-track traveling apparatus 2b are similar in structure, and therefore, only the first endless-track traveling apparatus 2a will be described here.

The first endless-track traveling apparatus 2a includes the casing 8, a motor unit 9, the magnet 10, a crawler pressing unit 11, a driving-side pulley axle unit 13, a driven-side pulley axle unit 15, a bevel gear mechanism portion 16, and a control circuit board (not shown). The casing 8 includes the base portion 6 and the cover portion 7.

An end surface 6c of the side portion 6a is brought into contact with the cover portion 7 so as to cover an opening bottom portion of the base portion 6 therewith, so that the casing 8 is formed. The base portion 6 is made of, for example, aluminum, while the cover portion 7 is made of a resin material. The motor unit 9, the magnet 10, the crawler pressing unit 11, the driving-side pulley axle unit 13, the driven-side pulley axle unit 15, the bevel gear mechanism portion 16, and the control circuit board (not shown) are fixed inside the casing 8. A top portion 6b of the base portion 6 has a through hole 6d formed therein to expose a portion of the crawler belt 4. The exposure of the crawler belt 4 allows the endless-track traveling apparatus 2 to have a reduced thickness. The cover portion 7 also has a through hole 7a formed therein to expose a portion of the crawler belt 4, which will be in contact with the traveling target.

The motor unit 9 is coupled to the driving-side pulley axle unit 13 through the bevel gear mechanism portion 16, and a driving-side pulley 12 included in the driving-side pulley axle unit is caused to rotate by rotation of a motor included in the motor unit 9. The driven-side pulley axle unit 15 includes a driven-side pulley 14. The motor unit 9 is connected to the control circuit board, and the rotation of the motor is controlled.

The crawler belt 4, which is made of a rubber material such as urethane, is wound on outer circumferential surface portions of the driving-side pulley 12 and the driven-side pulley 14, and is caused by rotation of the driving-side pulley 12 to rotate around the driving-side pulley 12 and the driven-side pulley 14.

The crawler pressing unit 11, which includes the crawler-side pressing member 17 as a plate-shaped member, is disposed opposed to the traveling target with the crawler belt 4 therebetween in a space surrounded by the driving-side pulley 12, the driven-side pulley 14, and the crawler belt 4. This arrangement allows the casing 8 to have a reduced size and a reduced thickness. The structure of the crawler pressing unit 11 will be described in detail below with reference to FIG. 4. The magnet 10 is formed by a permanent magnet, and attracts the traveling target. A force is applied to the casing 8, to which the magnet 10 is fixed, in such a direction as to bring the casing 8 closer to the traveling target, and the crawler-side pressing member 17, which is fitted to the casing 8 with coil springs 19 therebetween, presses the crawler belt 4 against the traveling target.

Figure 4:
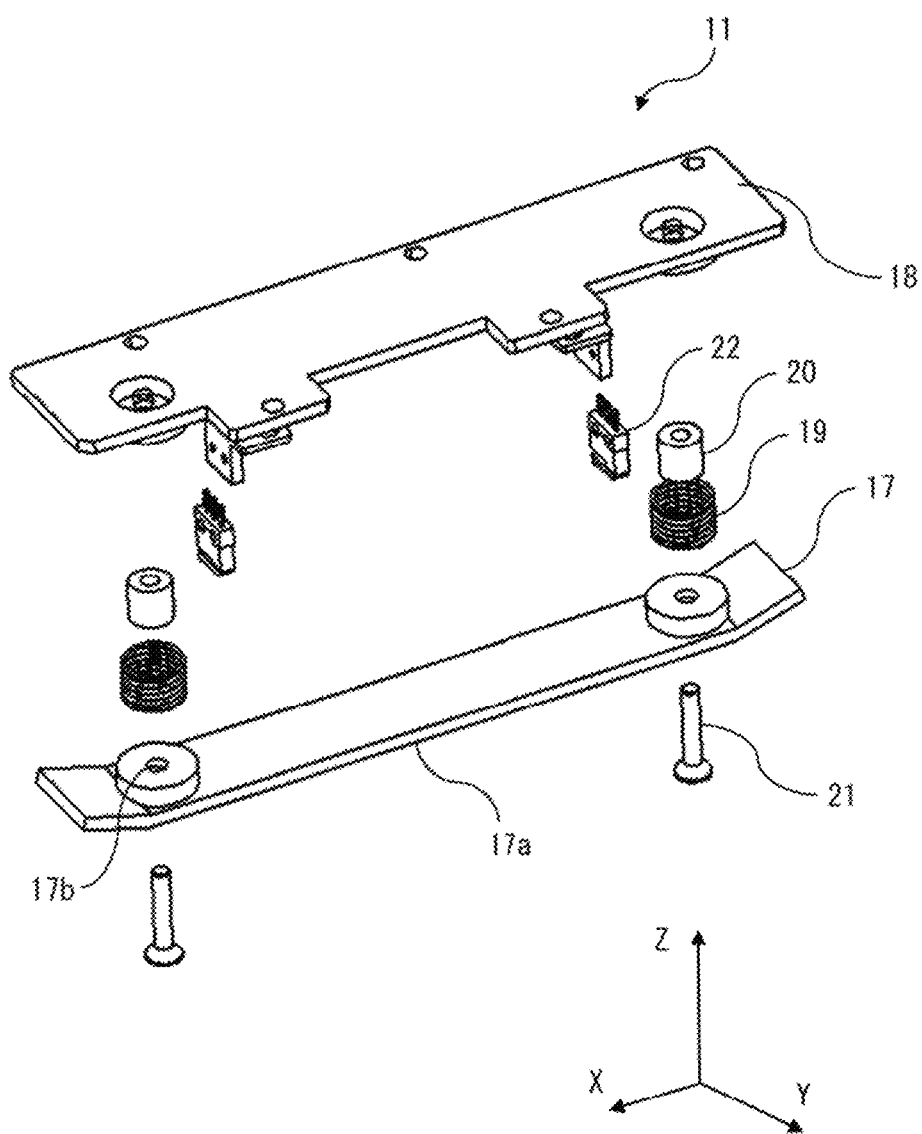
FIG. 4 is an exploded perspective view of a part of the endless-track traveling apparatus according to the first embodiment.

FIG. 4 is an exploded perspective view of the crawler pressing unit 11. The crawler pressing unit 11 includes the crawler-side pressing member 17, a base portion-side plate member 18, the coil springs 19, support members 20, guide shaft members 21, and sensing switches 22. The crawler-side pressing member 17 is fitted to the base portion-side plate member 18 through the guide shaft members 21 with the coil springs 19, which are elastic members, and the support members 20 therebetween. Each guide shaft member 21 is fitted by passing through an opening portion 17b included in the crawler-side pressing member 17. Each coil spring 19 is arranged to have one end in contact with the base portion-side plate member 18 and another end in contact with the crawler-side pressing member 17. In addition, the coil spring 19 is arranged to be capable of expanding and contracting to urge the crawler-side pressing member 17 in such a direction as to press the crawler-side pressing member 17 against the crawler belt 4. The crawler-side pressing member 17 makes contact with the crawler belt 4 at a flat portion 17a thereof, and is opposed to the traveling target. Each support member 20 restricts the direction in which the coil spring 19 expands and contracts and the range of the expansion and contraction, and has a length smaller than that of the coil spring 19. Each sensing switch 22, which is fixed to the base portion-side plate member 18, is a contact-type sensor for detecting the expansion and contraction of the coil spring 19. When the coil spring 19 contracts and causes the support member 20 to come into contact with the crawler-side pressing member 17, the sensing switch 22 also comes into contact with the crawler-side pressing member 17, resulting in an ON output of the sensing switch 22. While it is assumed here that the sensing switch 22 is brought out of contact with the crawler-side pressing member 17, resulting in an OFF output, when an expansion of the coil spring 19 has exceeded a predetermined interval, the sensing switch 22 may alternatively be arranged to produce an ON output when an expansion thereof has exceeded the predetermined interval. Because the crawler-side pressing member 17 is fitted at two positions together with the coil springs 19, the sensing switches are also disposed at two positions. Note that each sensing switch 22 is not limited to a contact-type sensor, but may alternatively be a sensor using another technique, such as an optical sensor. The base portion-side plate member 18 is fixed to the base portion 6.

Figure 5:
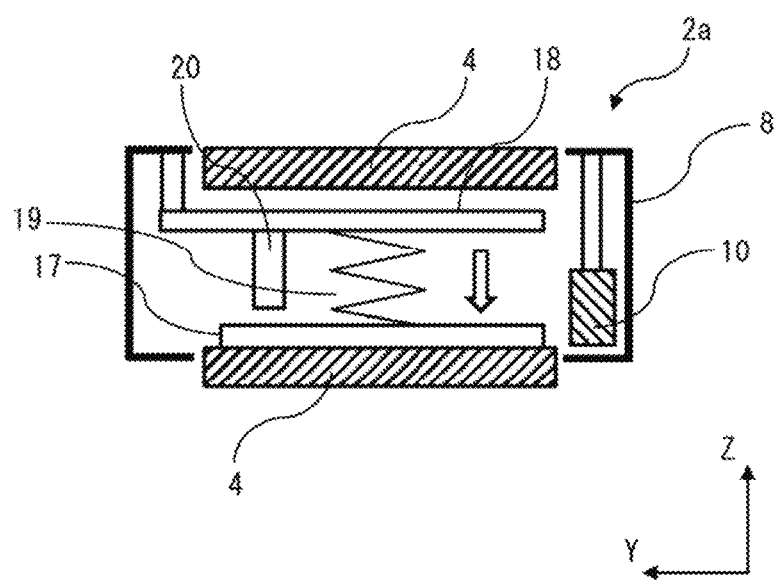
FIG. 5 is a sectional view illustrating an outline of a crawler pressing unit according to the first embodiment.
Figure 6:
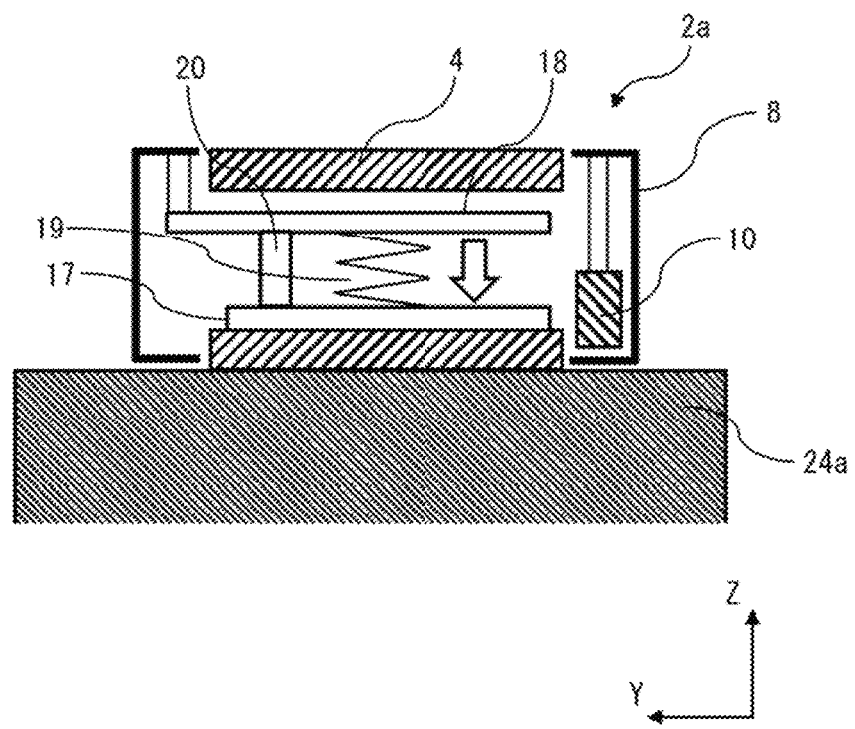
FIG. 6 is another sectional view illustrating an outline of the crawler pressing unit according to the first embodiment.

A function of the crawler pressing unit 11 will be described below. FIG. 5 is a sectional view illustrating an outline of the crawler pressing unit 11 when attraction by the magnet 10 is absent, whereas FIG. 6 is a sectional view illustrating an outline of the crawler pressing unit 11 when the magnet 10 is attracting the traveling target. Note that each of FIGS. 5 and 6 is a schematic diagram illustrating only important components. As illustrated in FIG. 5, the coil spring 19 is fitted between the crawler-side pressing member 17 and the base portion-side plate member 18, and even when the attraction by the magnet 10 is absent, the coil spring 19 is urged in such a direction as to press the crawler-side pressing member 17 against the crawler belt 4. At this time, the support member 20, which has a length smaller than that of the coil spring 19, is not in contact with the crawler-side pressing member 17. As illustrated in FIG. 6, when the magnet 10 is attracting the stator core 24a, which is the traveling target, the coil spring 19 bends and contracts, and the coil spring 19 further presses the crawler-side pressing member 17 against the crawler belt 4. The support member 20 is brought into contact with the crawler-side pressing member 17, thereby restricting the range of the contraction of the coil spring 19. The crawler belt 4 is thus adhered to the stator core 24a through the attraction by the magnet 10 and the pressure by the bending of the coil spring 19, enabling the endless-track traveling apparatus 2a to smoothly travel over the stator core 24a.

Figure 7:
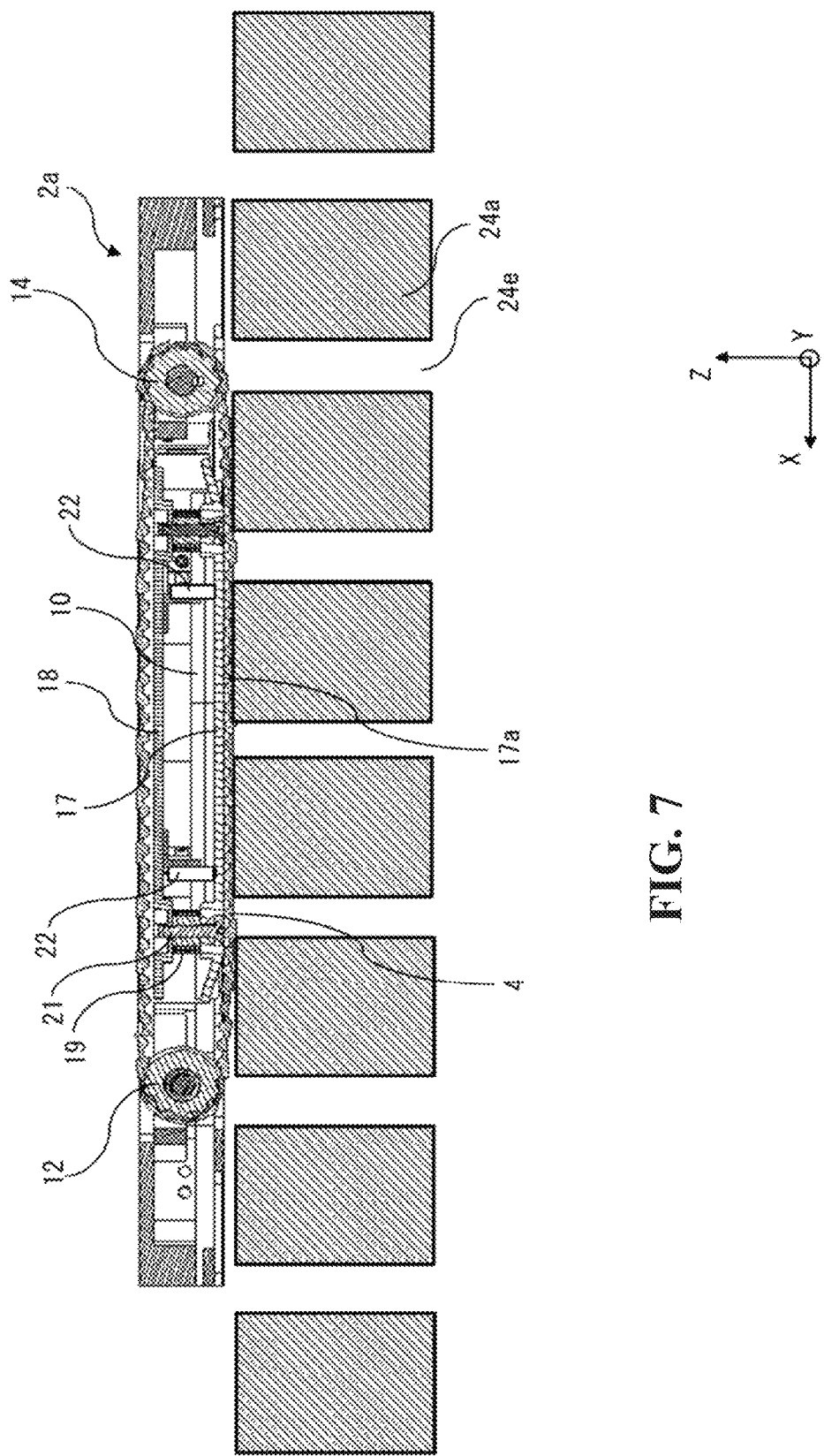
FIG. 7 is a sectional view illustrating the endless-track traveling apparatus according to the first embodiment traveling under normal conditions.
Figure 8:
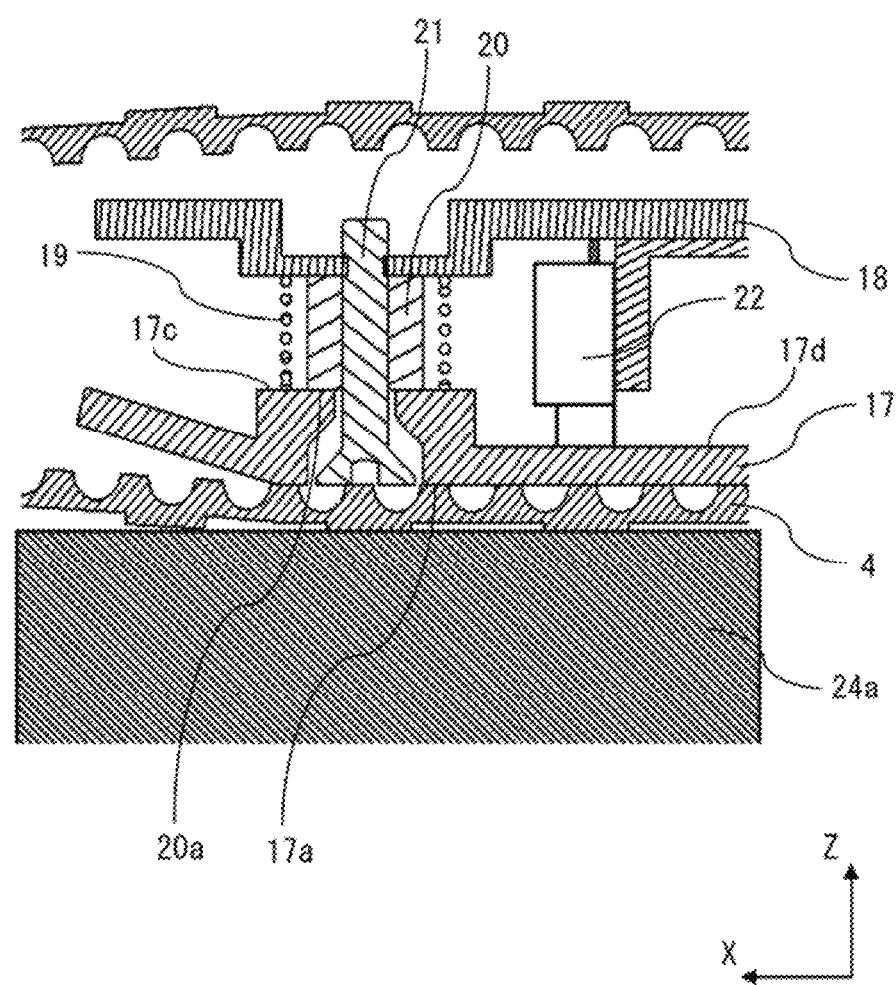
FIG. 8 is a sectional view illustrating a part of the endless-track traveling apparatus according to the first embodiment traveling under normal conditions.

Next, an operation at the time of normal traveling of the endless-track traveling apparatus 2a will be described below. FIG. 7 is a sectional view illustrating the endless-track traveling apparatus 2a traveling under normal conditions. FIG. 8 is a sectional view illustrating one of the coil springs 19 and its vicinity in an enlarged form when the endless-track traveling apparatus 2a is traveling under normal conditions, and is a specific configuration diagram illustrating the function explained above with reference to FIG. 6. In FIG. 7, the endless-track traveling apparatus 2a travels in the axial direction (i.e., the x direction) over the stator core 24a as described above with reference to FIG. 2. Portions of the stator core 24a are arranged at predetermined intervals with cooling spaces 24e intervening therebetween in the axial direction. These portions of the stator core 24a are arranged to have the same height in a z direction, but may be arranged to have different widths in the x direction. Note that guide members may be disposed in the cooling spaces 24e to further facilitate the traveling of the endless-track traveling apparatus 2a.

The magnet 10 attracts the stator core 24a, which is the traveling target, and each coil spring 19 bends and contracts in a direction toward the stator core 24a, so that the crawler-side pressing member 17 presses the crawler belt 4 against the stator core 24a. The flat portion 17a of the crawler-side pressing member 17 is arranged to have such a length that the flat portion 17a will be opposed to at least three portions of the stator core 24a. Thus, the crawler belt 4 is made to be in contact with three portions of the stator core 24a, enabling stable and smooth traveling of the endless-track traveling apparatus 2a.

As illustrated in FIG. 8, at the time of the normal traveling, the amount of expansion and contraction of the coil spring 19 is restricted by a contact between a bottom portion 20a of the support member 20 and an upper end portion 17c of the crawler-side pressing member 17, and the sensing switch 22 is in contact with an upper portion 17d of the crawler-side pressing member 17, resulting in the ON output of the sensing switch 22. Since the amount of expansion and contraction of the coil spring 19 is restricted, the guide shaft member 21 does not protrude toward the crawler belt 4 from the flat portion 17a of the crawler-side pressing member 17. The normal traveling can be detected by determining the output of the sensing switch 22. The crawler-side pressing member 17 presses the crawler belt 4 at all times due to the coil springs 19, and this enables smooth traveling with suppressed vibration even when there is an obstacle formed by a small extraneous object, a groove like the cooling space 24e, or the like. Because a surface of the flat portion 17a has a low-wear material applied thereto, the rotation of the crawler belt 4 is not hindered even when the flat portion 17a is in contact with the crawler belt 4.

Figure 9:
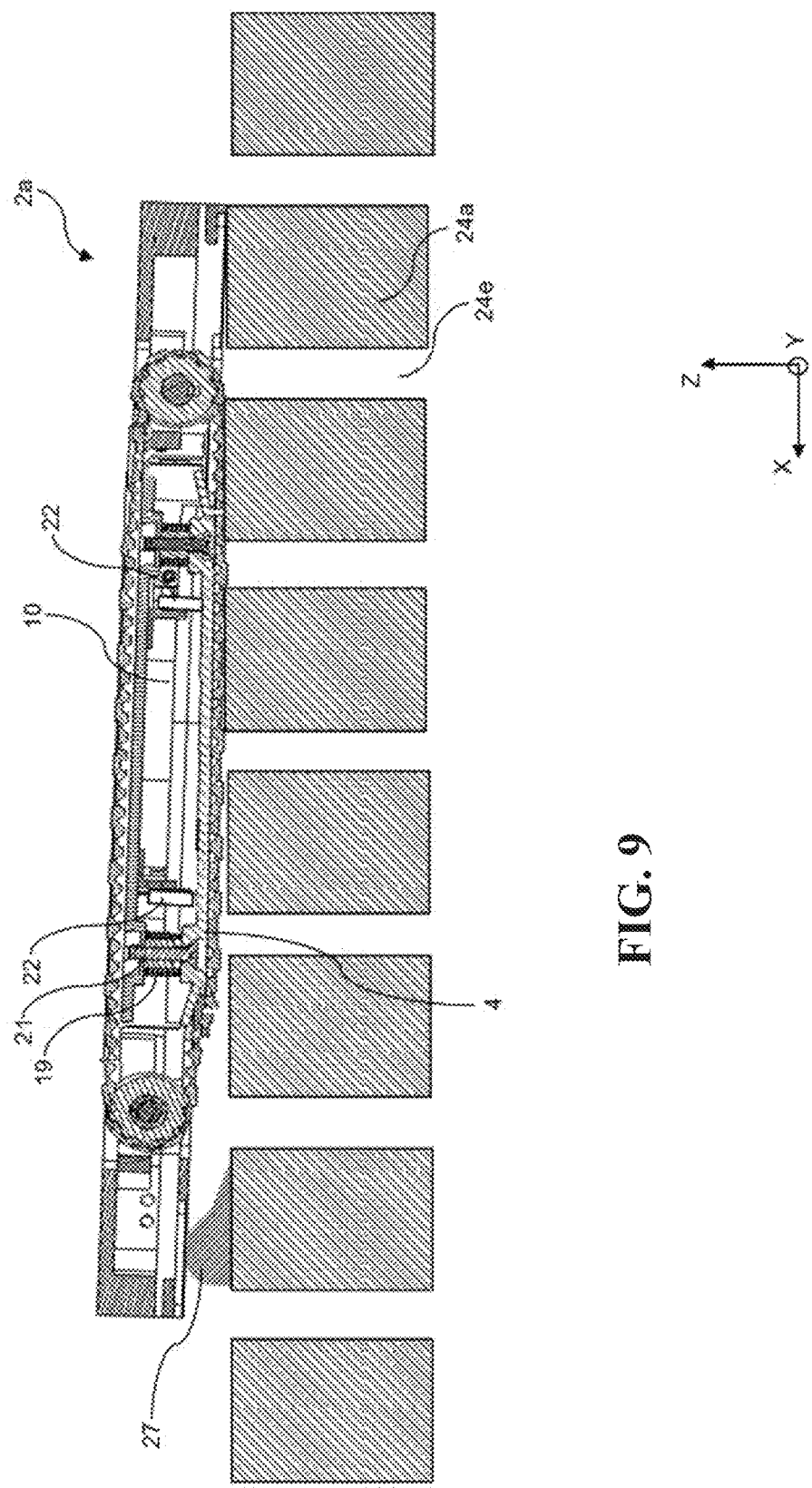
FIG. 9 is a sectional view of the endless-track traveling apparatus according to the first embodiment traveling under abnormal conditions.
Figure 10:
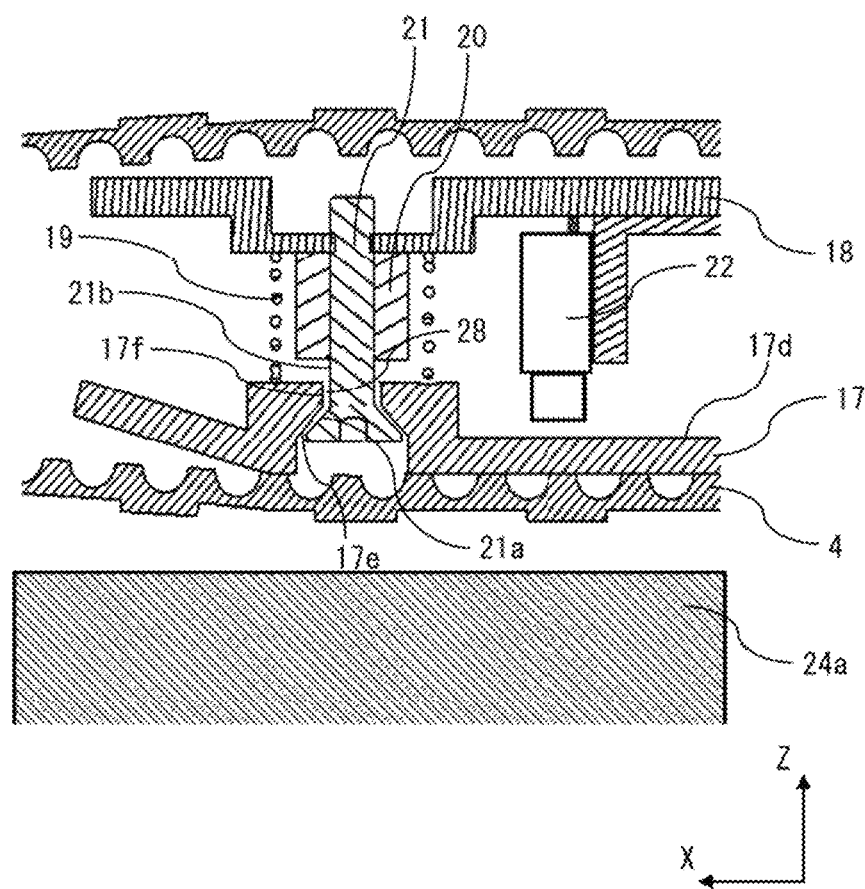
FIG. 10 is a sectional view illustrating a part of the endless-track traveling apparatus according to the first embodiment traveling under abnormal conditions.

Next, an operation at the time of abnormal traveling of the endless-track traveling apparatus 2a will be described below. FIG. 9 is a sectional view illustrating the endless-track traveling apparatus 2a traveling under abnormal conditions, and FIG. 10 is a sectional view illustrating one of the coil springs 19 and its vicinity in an enlarged form when the endless-track traveling apparatus 2a is traveling under abnormal conditions. In FIG. 9, the endless-track traveling apparatus 2a travels in the axial direction (i.e., the x direction) over the stator core 24a as described above with reference to FIG. 2, and an extraneous object 27 adhered onto the stator core 24a causes the endless-track traveling apparatus 2a to travel under abnormal conditions with a part of the endless-track traveling apparatus 2a being detached from the stator core 24a.

As illustrated in FIG. 10, at the time of the abnormal travel, the attraction by the magnet 10 is weakened to cause a separation between the crawler belt 4 and the stator core 24a, but a contact between a slanting surface 21a included in the guide shaft member 21 and a stopper surface 17e of the crawler-side pressing member 17 maintains contact between the crawler-side pressing member 17 and the crawler belt 4 with the coil spring 19 being bent and contracted. The sensing switch 22 is brought out of contact with the upper portion 17d of the crawler-side pressing member 17, resulting in a change to the OFF output of the sensing switch 22. The abnormal travel as illustrated in FIG. 9 can be detected by judging this output.

In addition, as illustrated in FIG. 10, a coupling portion 17f is formed with a gap portion 28 defined between a side surface of the opening portion 17b of the crawler-side pressing member 17 and a side surface portion 21b of the guide shaft member 21. Provision of the gap portion 28 enables the coil spring 19 to be deformed not only in a z-axis direction in which the guide shaft member 21 is fitted but also in a direction at an angle with respect to a z-axis. This makes it possible to detect a state of the abnormal travel as illustrated in FIG. 9 in which the endless-track traveling apparatus 2a is inclined with one of the sensing switches 22 being in an ON state and the other sensing switch 22 being in an OFF state.

Figure 11:
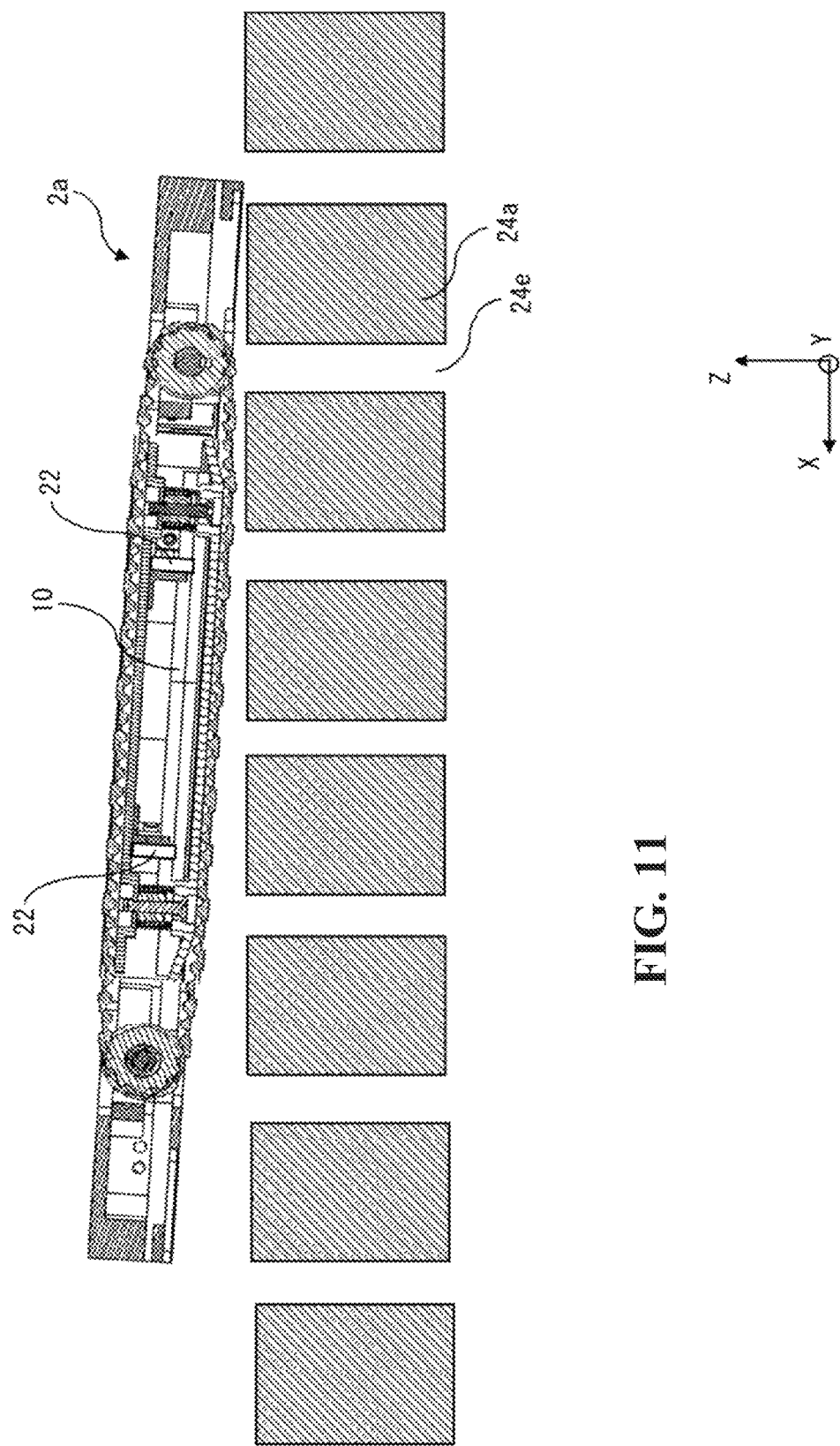
FIG. 11 is a sectional view illustrating the endless-track traveling apparatus according to the first embodiment traveling under other abnormal conditions.
Figure 12:
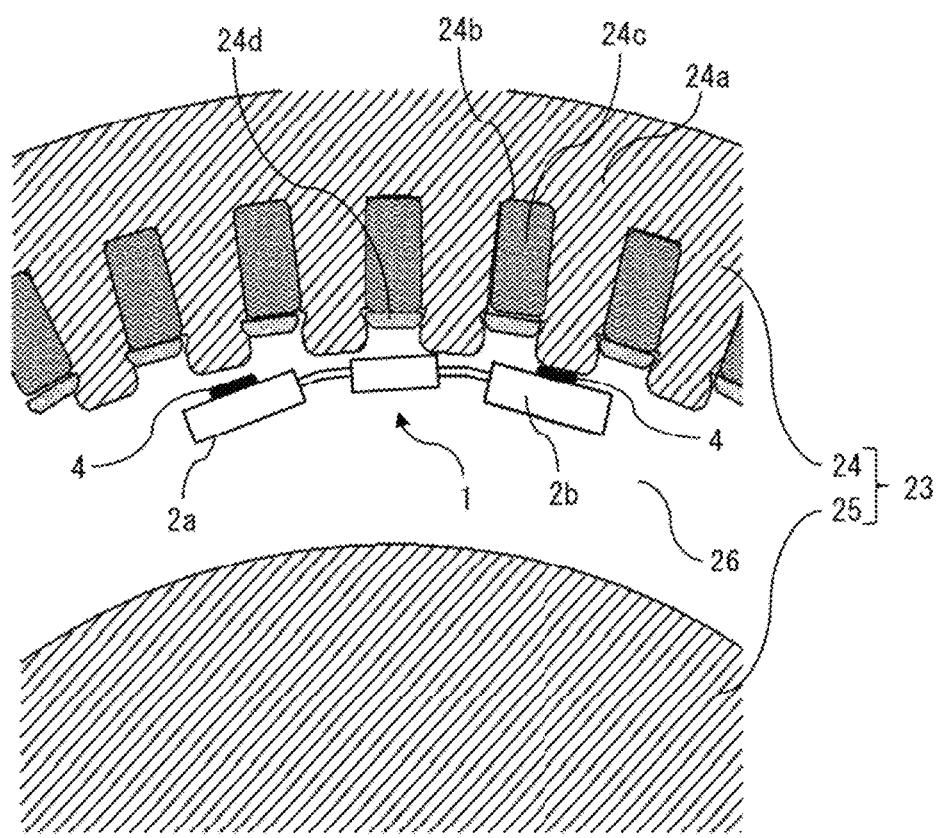
FIG. 12 is a diagram for explaining abnormal traveling of the movable body including the endless-track traveling apparatuses according to the first embodiment.

If the sensing switches 22 are not provided, the rotation of the crawler belt 4 would continue, and this would not only cause the crawler belt 4 to start sliding but also cause the distance between the magnet 10 and the stator core 24a to further increase to cause a significant reduction in the attraction, causing the endless-track traveling apparatus 2a to be completely detached from the stator core 24a (FIG. 11). FIG. 12 is a diagram for explaining abnormal traveling of the movable body 1. The movable body 1 is traveling with only the endless-track traveling apparatus 2b, and depending on the position of the movable body 1 at this time, the endless-track traveling apparatus 2b may also be detached from the stator core 24a. Such a detached state can also occur when the movable body 1 is pulled away and off by any of wires connected to the movable body 1 to supply a signal and power thereto. Therefore, a detached state needs to be detected instantaneously, and the sensing switches 22 are thus provided to detect the state as illustrated in FIG. 9 before the crawler belt 4 is completely detached from the stator core 24a, to avoid the state as illustrated in FIG. 11.

After the state illustrated in FIG. 9 is detected, for example, the rotation of the crawler belt 4 is stopped once, and then the crawler belt 4 is caused to rotate in a reverse direction to move the movable body 1 slightly backward. The position of the movable body 1 is corrected to achieve increased stability, and then the movable body 1 is again caused to travel forward.

Although, in the present embodiment, in view of the ease in manufacture, miniaturization, and so on, the two sensing switches 22 are provided and the amount of expansion and contraction of each coil spring 19 is detected on the basis of the state of contact between the corresponding sensing switch 22 and the crawler-side pressing member 17, this is not essential to the present disclosure, and the number of sensing switches 22 may be increased to improve the precision with which the state of contact is detected. Also note that the amount of expansion and contraction of each coil spring 19 may be obtained by measuring the angle or distance between the crawler-side pressing member 17 and the base portion-side plate member 18. Also note that the elastic member is not limited to the coil spring 19, but may alternatively be another elastic member, such as a plate spring or the like.

In addition, although, in the present embodiment, in view of the ease in manufacture, thickness reduction, miniaturization, and so on, the two pulleys are provided, this is not essential to the present disclosure, and an additional pulley may be disposed inside of the crawler belt 4 to stabilize the traveling of the movable body 1. In addition, although it has been assumed that the magnet 10 is disposed so as to be fixed to only the base portion 6, this is not essential to the present disclosure, and the magnet 10 may be further disposed on the crawler pressing unit 11 to attract the stator core 24a more strongly.

As described above, in the endless-track traveling apparatuses 2 and the movable body 1 including the same, the crawler-side pressing member 17 is fitted to the casing 8 with the coil springs 19 therebetween, and is in contact with the crawler belt 4 and opposite to the stator core 24a, and therefore, an obstacle formed by a groove existing in the stator core 24a or the like would not prevent smooth traveling with suppressed vibration. In addition, since the support members 20 that restrict the directions in which the coil springs 19 expand and contract and the range of the expansion and contraction are provided, each guide shaft member 21 does not protrude toward the crawler belt 4 from the flat portion 17a of the crawler-side pressing member 17 to hinder the travel, and a strong push of each sensing switch 22 does not occur. Moreover, since the sensing switches 22 as sensors for detecting the amounts of expansion and contraction of the coil springs 19 are provided in the crawler pressing unit 11, abnormal traveling caused by detachment of the crawler belt 4 from the stator core 24a can be detected, with the endless-track traveling apparatus 2 having a reduced size and a reduced thickness. Furthermore, since the coupling portion 17f is formed with the gap portion 28 defined between the side surface of the opening portion 17b of the crawler-side pressing member 17 and the side surface portion 21b of the guide shaft member 21, abnormal traveling caused by an inclination of the endless-track traveling apparatus 2 can be detected.

Furthermore, since a state in which the movable body 1 is in contact with the stator core 24a can be easily detected, it is easy to check the state of contact even in the case where the movable body 1 is installed in a generator into which it is not easy to insert the movable body 1. Furthermore, in a percussion inspection, vibration data acquired when the crawler belt 4 is not in proper contact with the stator core 24a has a problem in data accuracy, and accordingly, a highly accurate inspection can be enabled by first detecting the state of contact to determine whether a percussion inspection can be carried out, and, if the state of contact is unstable, correcting the position of the movable body 1, for example, to improve the state of contact.

Although the disclosure is described above in terms of an exemplary embodiment, it should be understood that the various features, aspects and functionality described in the embodiment are not limited in their applicability to the particular embodiment with which they are described, but instead can be applied, alone or in various combinations, to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 1 movable body
2 endless-track traveling apparatus
2a first endless-track traveling apparatus
2b second endless-track traveling apparatus
3 sensor mounting unit
3a side wall portion
3b casing
4 crawler belt
5 coupling member
5a bend portion
6 base portion
6a side portion
6b top portion 6c end surface
6d through hole
7 cover portion
7a through hole
8 casing
9 motor unit
10 magnet
11 crawler pressing unit
12 driving-side pulley
13 driving-side pulley axle unit
14 driven-side pulley
15 driven-side pulley axle unit
16 bevel gear mechanism portion
17 crawler-side pressing member
18 base portion-side plate member
19 coil spring
20 support member
21 guide shaft member
22 sensing switch
23 generator
24 stator
25 rotor
26 space portion
27 extraneous object
28 gap portion

The invention claimed is:

1. An endless-track traveling apparatus comprising:
a casing;
pulleys having axes arranged in parallel in the casing;
a motor for driving the pulleys; and
an endless track wound on outer circumferential surface portions of the pulleys to rotate together with the pulleys and move on a traveling target,
the endless-track traveling apparatus further comprising:
a plate-shaped member disposed in contact with the endless track and opposed to the traveling target in a space surrounded by the endless track, and fitted in the casing;
a magnet fixed in the casing to attract the traveling target;
an elastic member having one end in contact with an inside of the casing and another end in contact with the plate-shaped member, and urging the plate-shaped member in such a direction as to press the plate-shaped member against the endless track; and
a sensor for detecting expansion and contraction of the elastic member.

2. The endless-track traveling apparatus according to claim 1, wherein, together with a support member for restricting a direction in which the elastic member expands and contracts and a range of the expansion and contraction, the elastic member is fitted with a guide shaft member passing through the elastic member and the support member.

3. The endless-track traveling apparatus according to claim 2, wherein the guide shaft member passes through an opening portion included in the plate-shaped member, and the guide shaft member and the plate-shaped member are coupled with a gap portion provided between a side surface of the opening portion and a side surface of the guide shaft member.

4. A movable body of a generator inspection robot, the movable body comprising the endless-track traveling apparatus according to claim 3.

5. A movable body of a generator inspection robot, the movable body comprising the endless-track traveling apparatus according to claim 2.

6. A movable body of a generator inspection robot, the movable body comprising the endless-track traveling apparatus according to claim 1.

* * * * *